Sept. 30, 1958 R. L. ERWIN 2,854,209
GATE VALVE
Filed Jan. 9, 1957 2 Sheets-Sheet 1
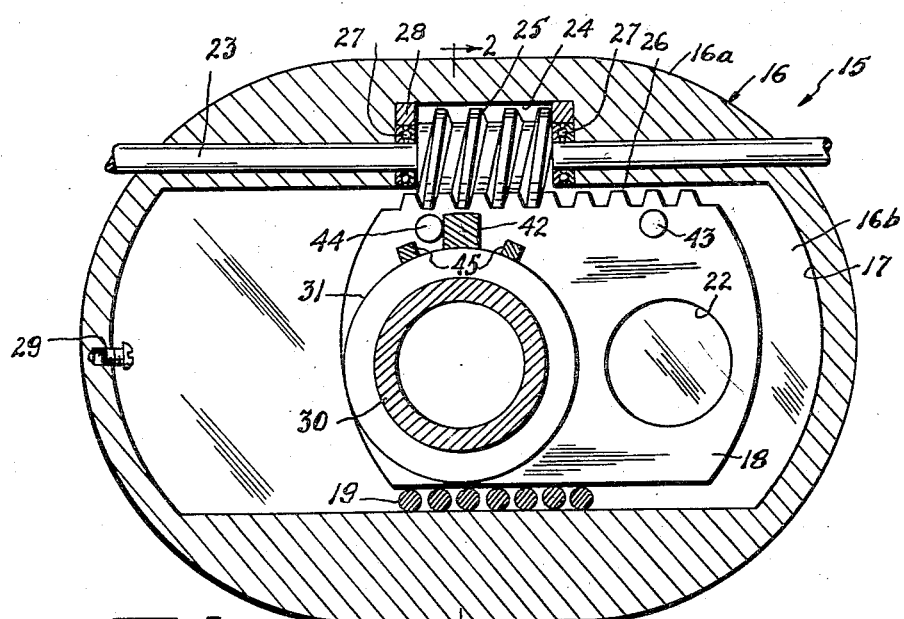
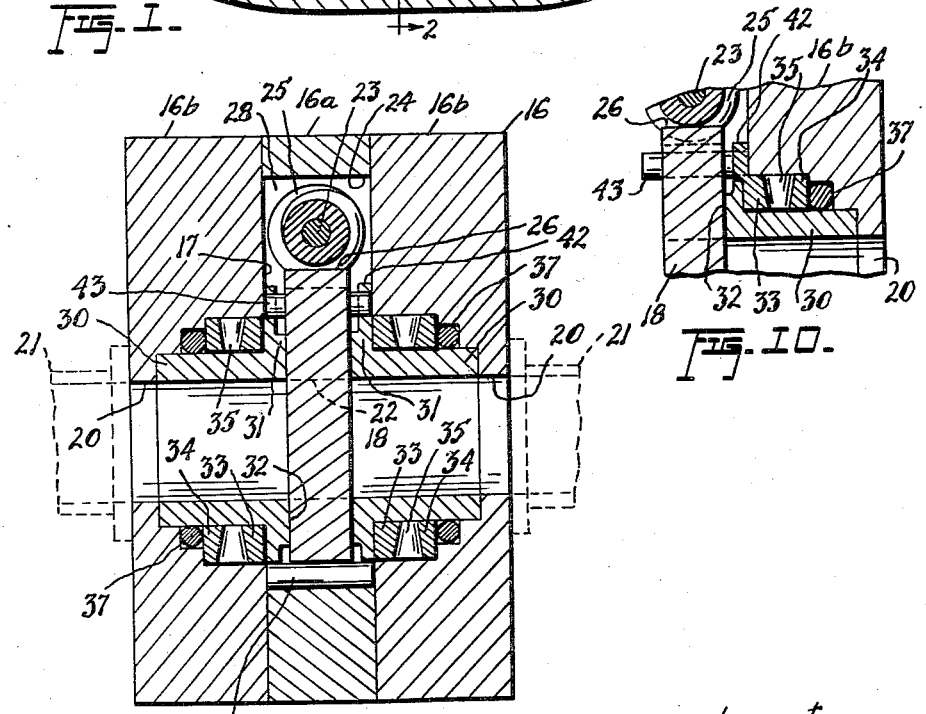
Inventor:
Robert L. Erwin
By Munson H. Lane
Att'y.

Sept. 30, 1958 — R. L. ERWIN — 2,854,209
GATE VALVE
Filed Jan. 9, 1957 — 2 Sheets-Sheet 2
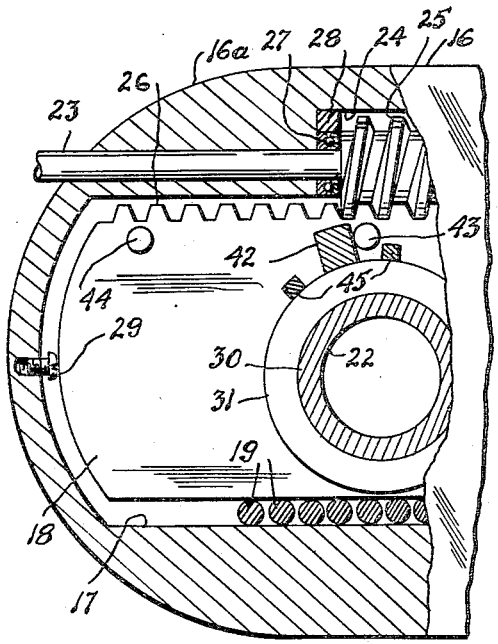
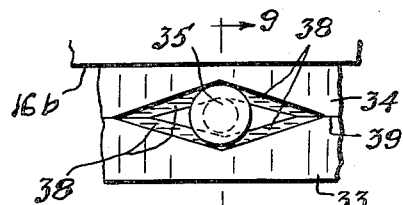
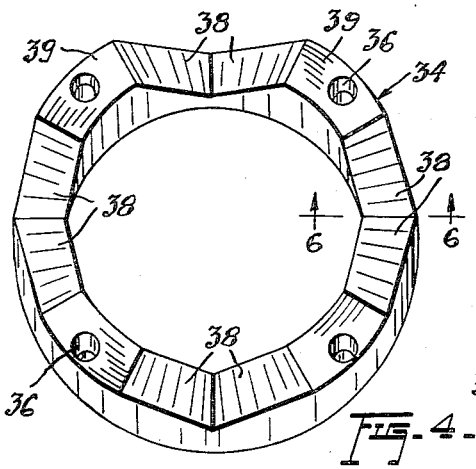
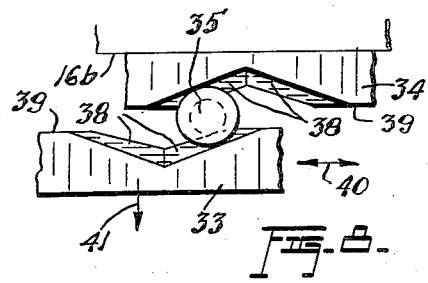
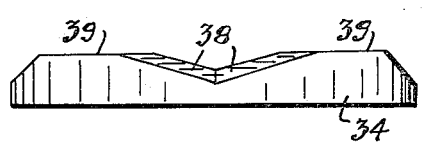
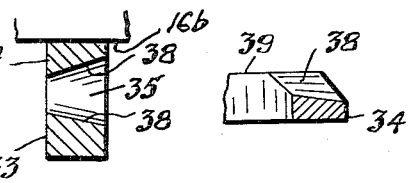
Inventor:
Robert L. Erwin
By Munson H. Lane
Atty.

United States Patent Office 2,854,209
Patented Sept. 30, 1958

2,854,209

GATE VALVE

Robert L. Erwin, Lakewood, Calif.

Application January 9, 1957, Serial No. 633,319

5 Claims. (Cl. 251—159)

This invention relates to new and useful improvements in valves, particularly gate valves, and the principal object of the invention is to provide a valve of the character herein disclosed which is highly efficient in operation and which, being devoid of the usual tapered valve block and/or tapered valve seats, may be easily and economically manufactured.

The present invention is an improvement of my earlier invention disclosed in my co-pending application Serial No. 614,690, filed October 8, 1956, now abandoned, of which this application is a continuation-in-part.

As such, the present invention contemplates the provision of a gate valve having a flat, one-piece plate-like valve block provided with a transverse passage which is registrable with a pair of valve ports at opposite sides of the block when the block is slid to an open position, an important feature of the invention residing in the provision of valve seats slidably disposed in the respective ports and adapted to sealingly engage opposite sides of the block when the valve is either open or closed.

Another important feature of the invention resides in the provision of means for sliding the valve block between its closed and open positions, together with means responsive to the sliding of the block for sealingly pressing the valve seats against opposite sides of the block in the open and closed positions of the valve, as above outlined.

Another important feature of the invention resides in the particular construction of the valve seat actuating means, the same including rotatable cam members adapted to exert pressure against the valve seats and urge the same in sealing engagement with the valve block in the open and closed positions of the valve.

Another important feature of the invention resides in the provision of anti-friction means for supporting the sliding valve block, so that the same may be slid between its open and closed positions with comparative ease.

The structural and functional advantages resulting from the aforementioned features will be dealt with hereinafter, upon completion of the description of the invention.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

Figure 1 is a longitudinal sectional view of the invention in a vertical plane, showing the valve in its closed position;

Figure 2 is a cross-sectional view, taken substantially in the plane of the line 2—2 in Figure 1;

Figure 3 is a fragmentary longitudinal sectional view, similar to that shown in Figure 1 but illustrating the valve in its open position;

Figure 4 is a perspective view of one of the cam members used in the invention;

Figure 5 is an edge view of the cam member shown in Figure 4;

Figure 6 is a sectional detail, taken substantially in the plane of the line 6—6 in Figure 4;

Figure 7 is a fragmentary side elevational view of the cam means in its retracted position;

Figure 8 is a fragmentary side elevational view of the cam means in its projected or extended position;

Figure 9 is a cross-sectional detail, taken substantially in the plane of the line 9—9 in Figure 7; and Figure 10 is a fragmentary sectional detail showing the operative connection between the valve block and the cam means.

Referring now to the accompanying drawings in detail, the gate valve is designated generally by the reference numeral 15 and embodies in its construction a suitable body or housing 16 consisting preferably of three complemental, disc-like parts or sections, namely, a center section 16a and two side sections 16b, these three sections being secured together in any suitable conventional manner such as by screws, or the like.

The body section 16a affords therein an elongated chamber 17 in which is disposed a longitudinally slidable valve block 18 of a flat one-piece plate-like configuration. To facilitate free sliding movement of this block, a set of anti-friction rollers 19 are provided at the bottom of the chamber 17 in engagement with the lower edge of the block. The rollers 19 may either move freely along the bottom of the chamber, or may be rotatably mounted on suitable shafts, if so preferred.

In any event, the body sections 16b are provided at opposite sides of the chamber 17 in the section 16a with a pair of valve ports 20 adapted to have suitable pipes or conduits connected thereto as indicated by the dotted lines 21 in Figure 2, these valve ports being in axial alignment transversely of the valve body, as shown. The block 18 is slidable from a closed position shown in Figure 1 to an open position shown in Figure 3, the block being provided in one end portion thereof with a transverse passage 22 which is registrable with the valve ports 20 when the block is in its open position. However, when the block is in its closed position, transverse communication between the two ports 20 is prevented by the imperforate portion of the block, as will be clearly apparent.

The sliding of the block 18 between its closed and open positions is effected by rotation of an actuating shaft 23 which is rotatably journalled in the upper portion of the body section 16a and passes through a recess 24 with which that section is formed. The shaft 23 has secured thereto a worm 25 which is disposed in the recess 24 and meshes with a toothed rack 26 provided on the upper edge portion of the block 18. Suitable end thrust bearings 27 are provided on the shaft 23 at the ends of the worm 25, these bearings being held in suitable retaining blocks 28, as illustrated. If desired or necessary, an adjustable stop 29 may be provided in the body section 16a for the valve block 18 when the latter is in its open position, or alternatively, the valve block may come in contact with the end of the section 16a to furnish the stop means, it being essential, of course, that when the block is slid to its open position the passage 22 in the block is in register with the valve ports 20, as already mentioned.

A pair of substantially tubular valve seats 30 are slidably disposed in the respective valve ports 20, it being understood that the term "valve ports" as used herein broadly designates enlarged portions at opposite sides of the valve body wherein the seats 30 are positioned and which are provided with the necessary port holes or openings in communication with the pipes or conduits 21.

The seats 30 are provided at their inner ends with annular rims or flanges 31 and the slidable disposition of the seats permits the inner faces or surfaces 32 thereof to be brought into a sealing engagement with opposite side surfaces of the block 18.

Means are provided for urging the seats 30 in the aforementioned sealing engagement with the valve block when the latter is slid to its open position as shown in Figure 3 or to its closed position as shown in Figure 1, these means comprising a pair of rotatable cam members 33 which are positioned on the seats 30 in contact with the flanges 31. Moreover, stationary cam members 34 are positioned on the seats 30 and are secured to the opposite side sections 16b of the body 16 by suitable screws (not shown), and sets of cam elements 35 are interposed between the rotatable cam members 33 and the stationary cam members 34. The screws for securing the cam members 34 are disposed in counter-bored apertures 36 with which the members 34 are formed, and suitable sealing gaskets 37 are provided between the cam members 34 and the body sections 16b, as illustrated in Figure 2.

The cam members 33, 34 are similar in construction as exemplified in Figures 4–9 inclusive, each being of an annular configuration and provided with circumferentially spaced, shallow V-shaped cam surfaces 38, separated circumferentially by plane portions 39 having the aforementioned apertures 36 formed therein. The cam surfaces 38 are inclined not only with respect to each other, but also from the outer edge to the inner edge of the annular cam members, whereby to accommodate the elements 35 which are in the form of tapered rollers, fitted complementally between the two cam members in each set.

The operation of the cam members will be understood from Figures 7 and 8 wherein it will be noted that when the rollers 35 are disposed in the deep portions of the cam surfaces 38, the plane portions 39 of the members 33, 34 are in contact as shown in Figure 7. However, when the cam member 33 is rotated in either direction relative to the member 34 as shown by the arrow 40, the rollers 35 will ride along opposite side portions of the inclined cam surfaces 38 of the respective cam members and will urge the member 33 away from the stationary member 34, as shown by the arrow 41 in Figure 8. Since the cam members 34 are secured to the valve body, the movement of the members 33 in the direction of the arrow 41 will exert pressure on the flanges 31 of the seats 30, causing the latter to slide toward the block 18 and press the inner faces 32 thereoef in sealing engagement with opposite sides of the valve block, as already mentioned.

Rotation of the cam members 33 is responsive to the sliding of the block 18 to either its open or closed position, this being effected by providing each cam member with a radially projecting lug 42 which is secured to the edge of the flange 31 as indicated in Figure 10 and is disposed in a vertical position as shown in Figure 1 when the cam members 33, 34 are retracted, as in Figure 7. However, transverse pins 43, 44 are provided in the upper edge portion of the block 18 and project to both sides thereof so as to form detents which come in contact with the lugs 42 when the block 18 nears the end of its travel at the open or closed position of the valve, at which time further movement of the block toward the open or closed position causes the detents 43, 44 to rotate the cam members 33 through the medium of the lugs 42 so that when the block ultimately reaches the open or closed position, the members 33 sealingly press the seats 30 against the opposite sides of the block.

If desired, projections 45 may be provided on the flanges 31 adjacent the lugs 42 for engagement by the detents 43, 44 when the block 18 is starting to slide away from its open or closed position, whereby to rotate the members 33 sufficiently to release the clamping action of the flanges 31 against the block 18 and permit free sliding of the block from one position to the other.

The many advantages of the invention will be readily understood from the foregoing description. The flat, one-piece valve block 18 and the valve seats 30 with their flat seating surfaces 32 eliminate the use of conventional tapers on these parts, which are difficult and expensive to machine. The block 18 rides freely on the anti-friction rollers 19 and does not become clamped by the seats 30 until it nearly reaches its open or closed positions, so that the movement of the block over almost the entire length of its travel is smooth and easy. The valve block is formed from only one piece of material, thus permitting the size and bulk of the valve body to be substantially reduced, as compared with conventional valves. The cam means 33, 34 with their rollers 35 avoid a wedging cam action, the rollers functioning as anti-friction elements between the members 33, 34, so that the required thrust for sealingly pressing the seats 30 against the block 18 is exerted in a smooth and efficient manner. If desired, suitable thrust bearings (not shown) may be used between the flanges 31 and the cam members 33 to reduce friction at these points. The actuating shaft 23, projecting from both ends of the recess 24 of the body section 16a is not subjected to fluid pressure from within the valve in one direction, so that the load on the thrust bearings 28 is equalized. Finally, the valve block 18 is held against lateral displacement only by the seats 30 at the opposite sides thereof and consequently, fluid pressure on the inlet side of the valve will assist in sustaining the block in sealing engagement with the seat at the outlet side.

It is to be noted that the interior of the body section 16a may be packed with suitable lubricant for the various moving parts, and the sealing action of the seats 30 with the block 18 in its open and closed positions will prevent any possibility of such lubricant mixing with the fluid passing through the valve.

The three part construction of the valve body permits the same to be quickly and easily assembled or disassembled for purposes of inspection or repair, the three body sections 16a, 16b being held together by suitable screws, or the like, as already noted.

While in the foregoing there has been described and shown the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. A gate valve comprising a valve body provided with an elongated chamber and with a pair of aligned ports at opposite sides of said chamber, a flat one-piece plate-like valve block slidable longitudinally in said chamber between closed and open positions, said block having a transverse passage therein registrable with said ports when the block is slid to its open position, a pair of substantially tubular valve seats slidable in the respective ports and having inner ends thereof sealingly engageable with opposite sides of said block, cam means provided on said seats and including rotatable cam members for urging the seats in sealing engagement with the block, means for sliding the valve block, and means actuated by sliding of said valve block for rotating said cam members when the block is slid to its open and closed positions.

2. The device as defined in claim 1 wherein said cam means include stationary cam members abutting opposite side portions of said body, and movable cam elements interposed between said rotatable and stationary cam members.

3. The device as defined in claim 1 wherein said means for rotating said cam members comprise projecting lugs provided on the cam members, and detents provided on said block, said detents being operatively engageable with said lugs when said block is slid to the open and closed positions.

4. In a gate valve, the combination of a valve body provided with an elongated chamber and with a pair of aligned ports at opposite sides of said chamber, a valve block slidable longitudinally in the chamber between closed and open positions, said block having a transverse passage therein registrable with said ports when the block is in its open position, a pair of substantially tubular valve seats slidable in the respective ports, annular flanges provided on said seats and sealingly engageable with opposite sides of said block, stationary cam members abutting opposite side portions of said body in surrounding relation with said seats, rotatable cam members positioned on said seats in abutment with said flanges and in opposing relation with the respective stationary cam members, movable cam elements interposed between the stationary and rotatable cam members, projecting lugs provided on said flanges, and detents provided on said block and engageable by said lugs, whereby to actuate said cam members to press said flanges against said block when the block is slid to its open and closed positions.

5. The device as defined in claim 4 wherein said stationary and rotatable cam members are provided with radially inwardly convergent cam surfaces, said cam elements comprising tapered rollers engageable with said surfaces.

References Cited in the file of this patent

UNITED STATES PATENTS

| | | |
|---|---|---|
| 1,168,490 | Duncan | Jan. 18, 1916 |
| 1,931,797 | Howard | Oct. 24, 1933 |
| 2,035,548 | Johnson | Mar. 31, 1936 |
| 2,298,036 | Cohen | Oct. 6, 1942 |
| 2,316,933 | Chaplin | Apr. 20, 1943 |
| 2,711,877 | Doster | June 28, 1955 |

FOREIGN PATENTS

| | | |
|---|---|---|
| 259,997 | Great Britain | Apr. 21, 1927 |
| 519,276 | Germany | Feb. 26, 1931 |
| 629,628 | Germany | May 11, 1936 |